(12) United States Patent
Shin et al.

(10) Patent No.: US 12,720,026 B2
(45) Date of Patent: Aug. 25, 2026

(54) PROJECTION DEVICE AND OPERATING METHOD THEREOF

(71) Applicant: SAMSUNG ELECTRONICS CO., LTD., Suwon-si (KR)

(72) Inventors: Hyungjong Shin, Suwon-si (KR); Yejin Kim, Suwon-si (KR); Jungkeun Kim, Suwon-si (KR); Pius Lee, Suwon-si (KR); Chaebin Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/775,904

(22) Filed: Jul. 17, 2024

(65) Prior Publication Data

US 2025/0030821 A1 Jan. 23, 2025

Related U.S. Application Data

(63) Continuation of application No. PCT/KR2024/008773, filed on Jun. 25, 2024.

(30) Foreign Application Priority Data

Jul. 18, 2023 (KR) ........................ 10-2023-0093345

(51) Int. Cl.
*H04N 9/31* (2006.01)
*G06V 20/50* (2022.01)

(52) U.S. Cl.
CPC ........... *H04N 9/3179* (2013.01); *G06V 20/50* (2022.01)

(58) Field of Classification Search
CPC ...... H04N 13/332; H04N 9/31; H04N 9/3152; H04N 9/3155; H04N 9/3158;
(Continued)

(56) References Cited

U.S. PATENT DOCUMENTS 9,558,541 B2 1/2017 Kim et al.
9,712,747 B2 * 7/2017 Ardö .................... H04N 23/68
(Continued)

FOREIGN PATENT DOCUMENTS

CN 118736033 A * 10/2024 ........... H04N 9/3179
JP 2011-017200 A 1/2011
(Continued)

OTHER PUBLICATIONS

International Search Report dated Sep. 30, 2024, issued by the International Searching Authority in International Application No. PCT/KR2024/008773.

(Continued)

*Primary Examiner* — John W Miller
*Assistant Examiner* — Human M Satti
(74) *Attorney, Agent, or Firm* — Sughrue Mion, PLLC

(57) ABSTRACT

A projection device includes: a projector; at least one memory storing one or more instructions; and at least one processor, wherein the one or more instructions, when executed by the at least one processor, cause the projection device to: obtain a first image; generate a blur image, based on the first image; obtain a background image by performing image processing on an edge region of the blur image to exhibit a vignetting effect on the edge region; and control the projector to project a second image in which the background image and the first image are combined.

18 Claims, 15 Drawing Sheets

(58) Field of Classification Search
CPC .. H04N 9/3161; H04N 9/3164; H04N 9/3167; H04N 9/3179; H04N 9/3182; H04N 9/3185; H04N 9/3188; H04N 9/3194; H04N 13/363; H04N 5/272; G02B 27/017; G02B 27/0179; G02B 2027/0178; G03B 21/56–625; G06T 5/00–94; G06T 3/40; G06V 20/50
See application file for complete search history.

(56) References Cited

U.S. PATENT DOCUMENTS

| | | | | |
|---|---|---|---|---|
| 10,217,195 | B1 * | 2/2019 | Agrawal | G06T 7/194 |
| 10,402,948 | B2 * | 9/2019 | Paris | G06T 3/4038 |
| 10,791,323 | B2 * | 9/2020 | Wuolijoki | G06T 5/70 |
| 2016/0180558 | A1 | 6/2016 | Kim | |
| 2017/0162171 | A1 * | 6/2017 | Cho | G06F 1/1652 |
| 2017/0310940 | A1 * | 10/2017 | Perdices-Gonzalez | G09G 3/36 |
| 2019/0236371 | A1 * | 8/2019 | Boonmee | G06V 10/764 |
| 2021/0133928 | A1 * | 5/2021 | Ding | G06T 3/40 |
| 2022/0122218 | A1 * | 4/2022 | Yoon | G06T 3/40 |
| 2023/0020363 | A1 | 1/2023 | Okamoto et al. | |
| 2024/0078642 | A1 * | 3/2024 | Son | G06F 3/011 |
| 2024/0112446 | A1 | 4/2024 | Chiba et al. | |

FOREIGN PATENT DOCUMENTS

| | | | |
|---|---|---|---|
| JP | 5392575 | B2 | 1/2014 |
| JP | 6880899 | B2 | 6/2021 |
| JP | 2022-35209 | A | 3/2022 |
| JP | 2022-077270 | A | 5/2022 |
| KR | 10-1583289 | B1 | 1/2016 |
| KR | 10 2016 0074288 | A | 6/2016 |
| KR | 10-2016-0135662 | A | 11/2016 |
| KR | 10-2017-0065926 | A | 6/2017 |
| KR | 10-2021-0108370 | A | 9/2021 |
| KR | 10-2022-0102450 | A | 7/2022 |
| WO | 2018012929 | A1 | 1/2018 |
| WO | 2022181174 | A1 | 1/2022 |

OTHER PUBLICATIONS

Communication dated Jun. 22, 2026, issued by the European Patent Office in European Application No. 24843345.0.

* cited by examiner 20
100
10
100

BACKGROUND IMAGE SETTING

ORIGINAL IMAGE SETTING on off 920

AUTOMATIC SETTING on off 930

USER SETTING

ATMOSPHERE SETTING BRIGHT

THEME SETTING OCEAN

PROJECTION DEVICE AND OPERATING METHOD THEREOF

CROSS-REFERENCE TO RELATED APPLICATIONS

This application is a continuation of International Application No. PCT/KR2024/008773 designating the United States, filed on Jun. 25, 2024, in the Korean Intellectual Property Receiving Office and claiming priority to Korean Patent Application No. 10-2023-0093345 filed on Jul. 18, 2023, in the Korean Intellectual Property Office. The disclosures of each of these applications are incorporated by reference herein in their entireties.

BACKGROUND

1. Field

The disclosure relates to a projection device and an operating method thereof.

2. Description of Related Art

A projection device projects an image onto a screen or a space. The projection device may be a device that includes a projector that projects an image, a device for providing virtual reality (VR), augmented reality (AR), or mixed reality (MR), or the like. Projection devices are used in various fields, for example, may be used to lecture or give presentation in a classroom or a conference room and may be used to project a movie on a screen in a theater. The device for providing VR, AR, or MR may provide experience as if a user is watching a movie in a theater by displaying an image on a screen (display) located near the eyes of the user when the user wears the device.

A home theater may be configured by using a device that includes the projector and cases where image content is viewed through a big screen, for example, a movie is watched or a game is played on a big screen, have increased. When viewing the image content by using the device that includes the projector, not only high resolution of the image content and projection performance, but also a viewing environment, are useful.

When the image content is viewed by using a device including the projector or the device for providing VR, AR, or MR, a boundary between a region (screen) on which the image content is projected and a remaining region may be clearly visible. Accordingly, the user may feel a disconnection between a space on which the image content is projected and a real space where the user exists.

SUMMARY

According to an aspect of the disclosure, a projection device may include a projector, at least one memory storing one or more instructions, and at least one processor.

The one or more instructions, when executed by the at least one processor, cause the projection device to obtain a first image.

The one or more instructions, when executed by the at least one processor, may cause the projection device to generate a blur image, based on the first image.

The one or more instructions, when executed by the at least one processor, may cause the projection device to obtain a background image by performing image processing on an edge region of the blur image to exhibit a vignetting effect on the edge region.

The one or more instructions, when executed by the at least one processor, may cause the projection device to control the projector to project a second image in which the background image and the first image are combined.

According to an aspect of the disclosure, an operating method of a projection device may include obtaining a first image.

The operating method may include generating a blur image, based on the first image.

The operating method may include obtaining a background image by performing image processing on an edge region of the blur image to exhibit a vignetting effect on the edge region.

The operating method may include projecting a second image in which the background image and the first image are combined.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a reference diagram illustrating a method by which a projection device generates an image including a vignetting effect, according to an embodiment of the disclosure;

FIG. 11 is a diagram for describing an operation by which a projection device generates a background image, according to an embodiment of the disclosure;

DETAILED DESCRIPTION

Figure 1:
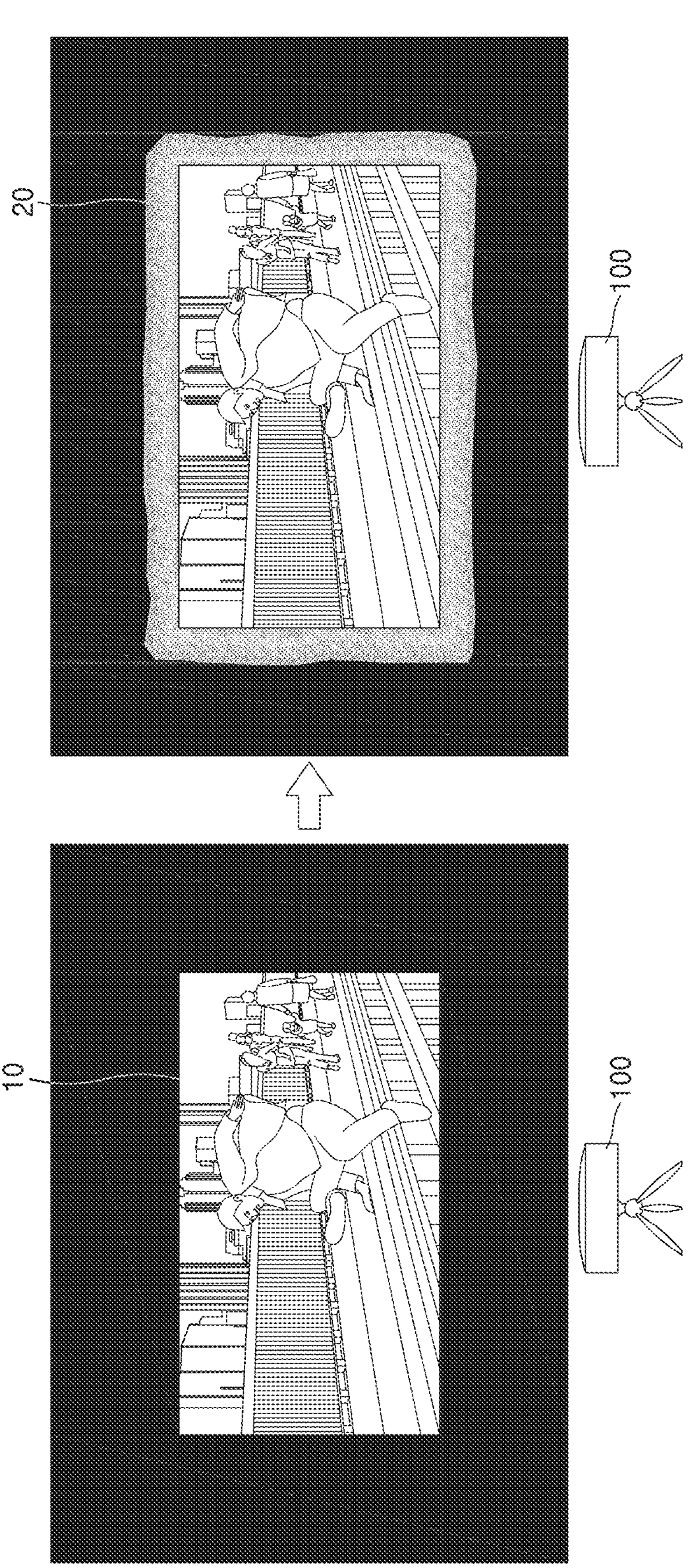
FIG. 1 is a diagram illustrating various projection environments, according to an embodiment of the disclosure.

The present disclosure may be variously modified and have one or more embodiments. Example embodiments of the present disclosure will be illustrated in the drawings and be described in detail in the detailed description. However, it is to be understood that the disclosure are not limited to specific embodiments, but include all modifications, equivalents, and substitutions according to example embodiments of the disclosure. Throughout the accompanying drawings, similar components will be denoted by similar reference numerals.

Throughout the disclosure, the expression "at least one of a, b or c" indicates only a, only b, only c, both a and b, both a and c, both b and c, or all of a, b, and c.

The terms used in the disclosure will be briefly defined, and the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the disclosure.

When a part "includes" or "comprises" an element, unless there is a particular description contrary thereto, the part may further include other elements, not excluding the other elements. In addition, terms such as "unit", "-or/-er", and "module" described in the disclosure denote a unit that processes at least one function or operation, which may be implemented in hardware or software, or implemented in a combination of hardware and software.

Below, embodiments of the disclosure will be described in detail with reference to the accompanying drawings such that one of ordinary skill in the art may easily implement the disclosure. However, the disclosure may be implemented in various different forms and is not limited to an embodiment of the disclosure described herein. Also, in the drawings, parts irrelevant to the description are omitted in order to clearly describe the disclosure, and like reference numerals designate like elements throughout the disclosure.

In the present disclosure, the term "user" according to an embodiment of the disclosure denotes a person who controls a system, a function, or an operation, and may include a developer, a manager, or an installation engineer.

Also, in the present disclosure, an "image" or a "picture" according to an embodiment of the disclosure may denote a still image, a moving image including a plurality of continuous still images (or frames), or a video.

FIG. 1 is a diagram illustrating various projection environments according to an embodiment of the disclosure.

A projection device 100 according to an embodiment of the disclosure may project image content on a screen. Here, the screen on which the image content is projected may be configured in any one of various forms. When the projection device 100 is a device that includes a projector, the screen may denote a physical space on which the image content is projected. For example, the screen may include a wall or a screen formed of fabric.

When the projection device 100 is a device for providing virtual reality (VR), augmented reality (AR), or mixed reality (MR), the screen may denote a display included in the projection device 100. For example, the device for providing VR, AR, or MR may be realized in the form a glasses type wearable device including a head mounted display (HMD), which is mountable on a head part, and may include a display. The display may be a transparent display or an opaque display. The device for providing VR, AR, or MR may output (display) the image content to the display.

Hereinafter, for convenience of description, a case where the projection device 100 is a device that includes a projector is described as an example, but the disclosure may be equally applied even when the projection device 100 is the device for providing VR, AR, or MR.

Referring to FIG. 1, when the projection device 100 according to an embodiment of the disclosure projects the image content on the screen, an edge of the screen or an edge 10 of the projected image content may be clearly distinguished from a space on which the image content is not projected. Accordingly, a viewer (user) viewing the projected image content may feel a disconnection between an image content space and a space where the user exists, and thus may feel as if a viewing experience is spatially broken.

The projection device 100 according to an embodiment of the disclosure may provide a vignetting effect 20 at an edge region of the projected image content.

Vignetting may indicate a dark shadow or blurring that appears at an edge portion of a photograph or an image. Such a phenomenon occurs due to an optical element or a lens system of a camera and occurs when the amount of light reaching an outer portion of an image is less than the amount of light reaching a center portion of the image.

The projection device 100 according to an embodiment of the disclosure may provide the vignetting effect 20 by generating a shadow (shade) in the edge region of the projected image content. When the vignetting effect 20 is exhibited in the edge region of the projected image content, the disconnection between a space where the image content is displayed and the space where the viewer exists may be reduced. Accordingly, the viewer may further concentrate on viewing the image content and have a viewing experience as if the image content space and the real space are connected to each other.

Hereinafter, operations by which the projection device 100 according to an embodiment of the disclosure processes and projects image content such that a vignetting effect is exhibited in an edge region of the image content will be described in detail with reference to the drawings.

Figure 2:
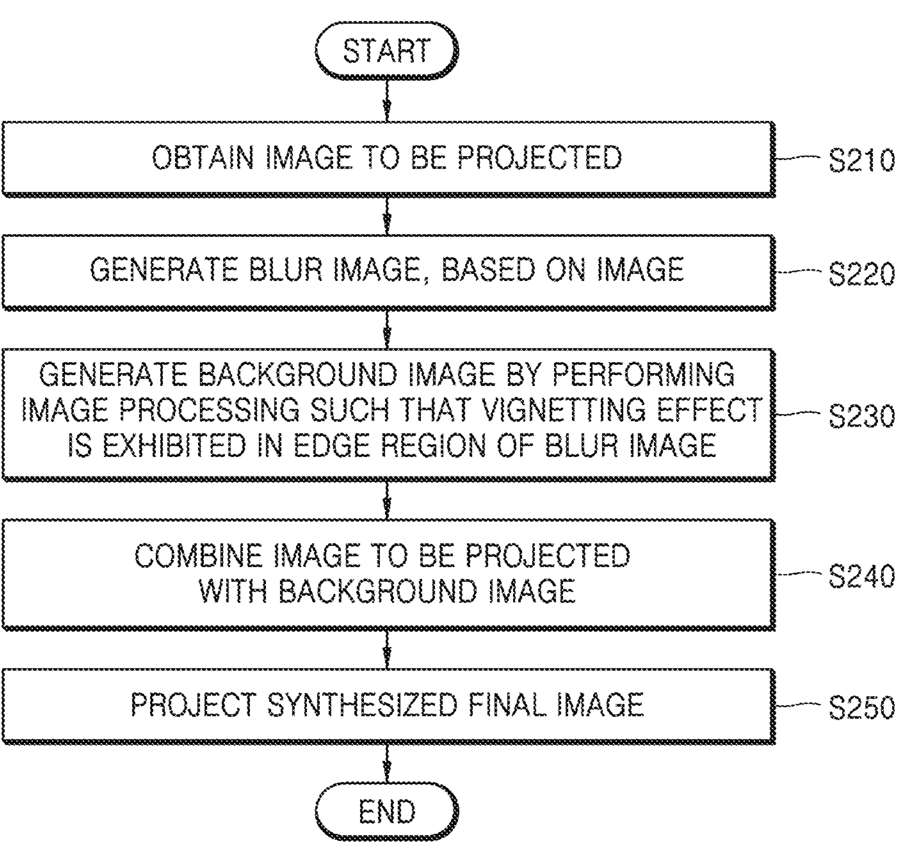
FIG. 2 is a flowchart of an operating method of a projection device, according to an embodiment of the disclosure.

FIG. 2 is a flowchart of an operating method of the projection device 100, according to an embodiment of the disclosure.

Referring to FIG. 2, the projection device 100 according to an embodiment of the disclosure may obtain an image to be projected (S210).

The image according to an embodiment of the disclosure may be an image pre-stored in the projection device 100 or an image received from an external device. However, the image is not limited thereto. Also, the image according to an embodiment of the disclosure may be an image on which various types of image processing have been performed by a video processor, such as decoding, scaling, noise filtering, frame rate conversion, resolution conversion, and the like.

The projection device 100 according to an embodiment of the disclosure may generate a blur image, based on the obtained image (S220).

For example, the projection device 100 may generate the blur image by performing blur processing on the obtained image. Blurring or blur processing may be performed to blur an image by reducing sharpness of the image and providing a soft blurring effect.

The projection device 100 may perform the blur processing on the image through filtering. The projection device 100 may perform filtering on the image by using various filters. For example, the projection device 100 may perform blur processing (Gaussian blurring) by using a Gaussian filter, blur processing (average blurring) by using an average filter, and blur processing (median blurring) by using a median filter. Such filters are only examples and the projection device 100 according to an embodiment of the disclosure may perform blur processing by using various filters.

Alternatively or additionally, the projection device 100 may obtain a background original image, based on the image to be projected. For example, the projection device 100 may analyze the image to be projected to obtain information about an atmosphere, a theme, and the like indicated in the image, and generate the background original image, based on the obtained information. Alternatively or additionally, the projection device 100 may receive the background original image from an external device. The projection device 100 may generate the blur image by performing blur processing on the background original image.

Alternatively or additionally, the projection device 100 may generate the blur image by performing blur processing on another image associated with the image to be projected. For example, the other image associated with the image to be projected may include another image stored in a same region as the image to be projected, another image classified as a same group as the image to be projected, according to a specific standard, another image having a same or similar atmosphere as the image to be projected, and another image indicating a same or similar theme as the image to be projected. However, the other image associated with the image to be projected is not limited thereto.

The projection device 100 according to an embodiment of the disclosure may generate a background image by performing image processing such that a vignetting effect is exhibited in an edge region of the blur image (operation S230).

The projection device 100 according to an embodiment of the disclosure may generate the vignetting effect by generating a shadow (shade) in the edge region of the blur image. Here, the projection device 100 may differently apply a vignetting ratio according to locations of the edge region of the blur image. The vignetting ratio is a value indicating a degree of vignetting, and when the value increases, a dark region is increase, and when the value decreases, the dark region is decreased. This will be described in detail with reference to FIG. 5.

The projection device 100 according to an embodiment of the disclosure may differently apply the vignetting ratio applied to the blur image according to time. Accordingly, the vignetting effect exhibited in an edge region of the background image may vary over time.

The projection device 100 according to an embodiment of the disclosure may combine the image to be projected with the background image (operation S240).

For example, the projection device 100 may generate a final image by combining the image to be projected with the background image generated in operation S230. The projection device 100 may generate the final image by scaling the background image or the image to be projected, based on a size of a screen. Here, the final image may be an image exhibiting the vignetting effect in a peripheral region of an edge of the image to be projected.

The projection device 100 according to an embodiment of the disclosure may project the final image on the screen or a space (operation S250).

By projecting the final image obtained by exhibiting the vignetting effect in the peripheral region of the edge of the image to be projected, a user or a viewer may further concentrate on viewing image content and have a viewing experience as if image content space and a real space are connected to each other.

Figure 3:
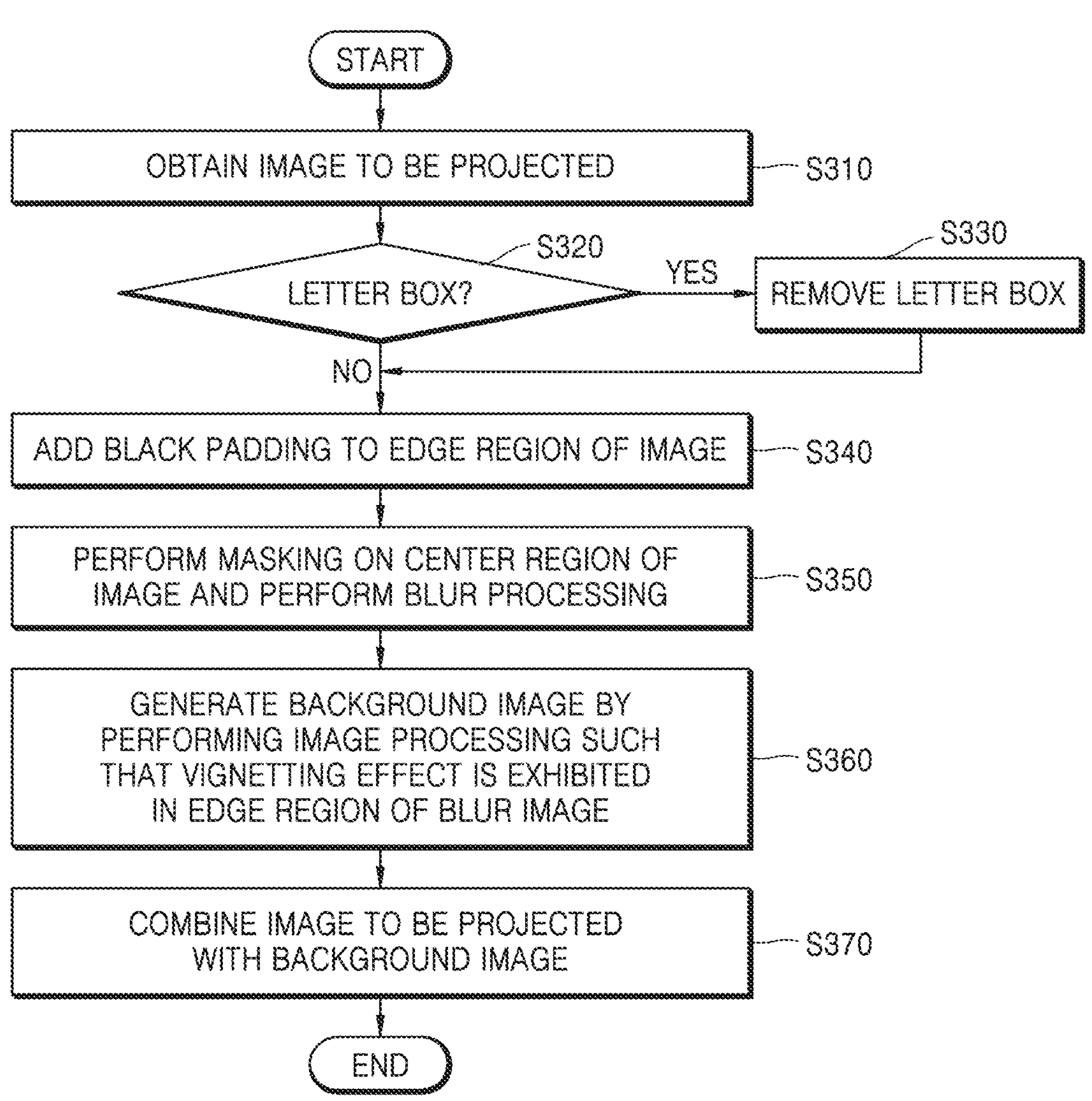
FIG. 3 is a flowchart of a method by which a projection device generates an image including a vignetting effect, according to an embodiment of the disclosure.
Figure 4:
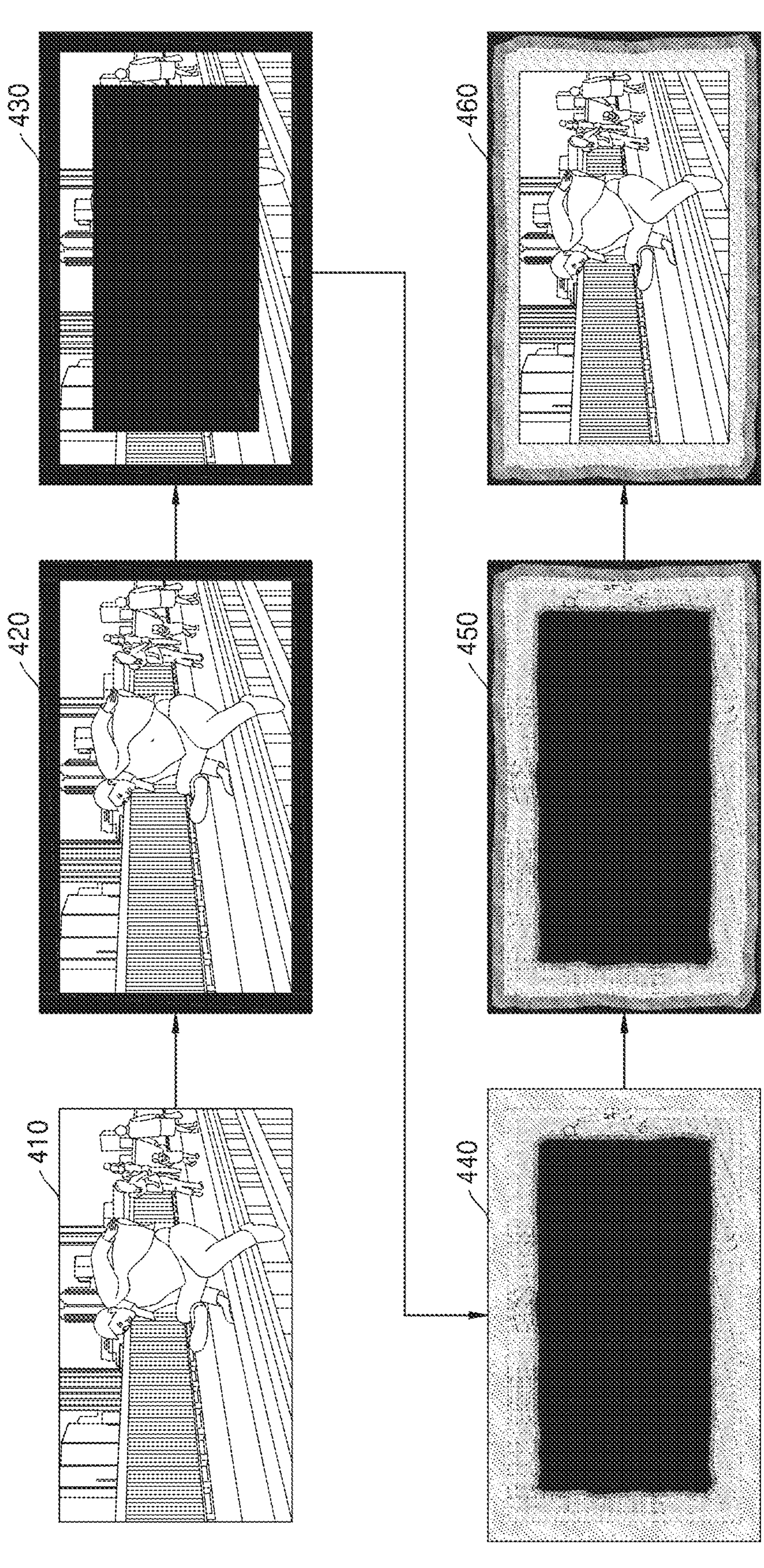
FIG. 4 is a reference diagram illustrating a method by which a projection device generates an image including a vignetting effect, according to an embodiment of the disclosure.

FIG. 3 is a flowchart of a method by which the projection device 100 generates an image including a vignetting effect, according to an embodiment of the disclosure, and FIG. 4 is a reference diagram for describing FIG. 3.

Referring to FIGS. 3 and 4, the projection device 100 according to an embodiment of the disclosure may obtain an image 410 to be projected (operation S310).

The projection device 100 according to an embodiment of the disclosure may determine whether the image 410 includes a letter box (operation S320), and when the letter box is included, remove the letter box from the image 410 (operation S330). A letter box may be a black bar displayed on a top, bottom, left, or right region of an image.

The projection device 100 according to an embodiment of the disclosure may add a black padding 420 to top, bottom, left, and right regions of the image 410 not including the letter box or from which the letter box has been removed (operation S340).

Padding denotes expanding an edge of an image by filling the surroundings of the image with additional values. Black padding indicates that filled pixel values are 0 and may be referred to as zero padding.

The projection device 100 according to an embodiment of the disclosure may generate a blur image by performing masking on a center region of the image 410 and performing blur processing thereon (operation S350).

The projection device 100 may perform the blur processing on the image 410 through filtering. Blur processing using a filter has been described in detail above with reference to operation S220 of FIG. 2, and thus, detailed description thereof is not provided again.

During the blur processing, a masked region 430 obtained by masking the center region of the image 410 does not require the blur processing, and thus, an overall throughput may be reduced. A size of the masked region 430 may be adjusted according to a size of the image 410.

A blur image 440 generated in operation S350 of FIG. 3 may include a vignetting effect according to the black padding 420 added in operation S340 of FIG. 3.

The projection device 100 according to an embodiment of the disclosure may generate a background image 450 by performing image processing such that an additional vignetting effect is exhibited in an edge region of the blur image 440 (operation S360).

The projection device 100 may generate the vignetting effect by generating a shadow (shade) in the edge region of the blur image 440. Here, the projection device 100 may differently apply a vignetting ratio according to locations of the edge region. This will be described with reference to FIG. 5.

Figure 5:
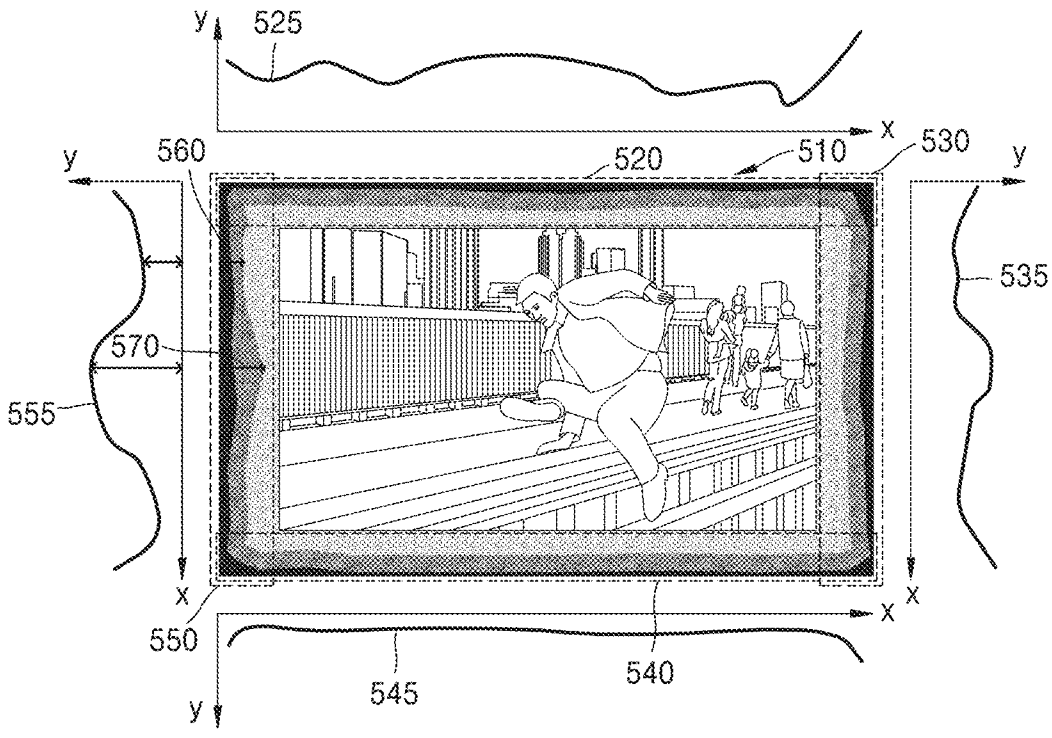
FIG. 5 is a diagram illustrating an example in which a projection device performs image processing by differently applying a vignetting ratio, according to an embodiment of the disclosure.

FIG. 5 is a diagram illustrating an example in which the projection device 100 performs image processing by differently applying a vignetting ratio, according to an embodiment of the disclosure.

Referring to FIG. 5, the projection device 100 according to an embodiment of the disclosure may differently apply a vignetting ratio according to locations of an edge region of a blur image 510. For example, the projection device 100 may perform image processing by applying functions representing vignetting ratios according to locations of top, bottom, left, and right edge regions, respectively. The projection device 100 may perform vignetting by applying a first function 525 to a top edge region 520 of the blur image 510. Here, the first function 525 may be a function using a horizontal location of the top edge region 520 as an x-axis and a vignetting ratio as a y-axis.

Also, the projection device 100 may perform vignetting by applying a second function 535 to a right edge region 530 of the blur image 510. Here, the second function 535 may be a function using a vertical location of the right edge region 530 as an x-axis and a vignetting ratio as a y-axis.

Also, the projection device 100 may perform vignetting by applying a third function 545 to a bottom edge region 540 of the blur image 510. Here, the third function 545 may be a function using a horizontal location of the bottom edge region 540 as an x-axis and a vignetting ratio as a y-axis.

Also, the projection device 100 may perform vignetting by applying a fourth function 555 to a left edge region 550 of the blur image 510.

The vignetting ratios respectively represented by the first to fourth functions 525 to 555 according to an embodiment of the disclosure may denote ratios of dark regions. For example, a ratio of a dark region may be high at a location where a vignetting ratio is high (refer to a reference numeral 570) and a ratio of a dark region may be low at a location where a vignetting ratio is low (refer to a reference numeral 560).

Each of the first to fourth functions 525 to 555 may be a function in which a y value (vignetting ratio) changes over time. Accordingly, a vignetting effect of an image to be projected may vary over time.

Referring back to FIGS. 3 and 4, the projection device 100 according to an embodiment of the disclosure may combine the image 410 to be projected with the background image 450 (operation S370).

The projection device 100 may generate a final image 460 by scaling the background image 450 or the image 410 to be projected, based on a size of a screen. Here, the final image 460 may be an image exhibiting the vignetting effect in a peripheral region of an edge of the image 410 to be projected.

The projection device 100 according to an embodiment of the disclosure may project the final image 460 including the vignetting effect on the screen or a space.

Figure 6:
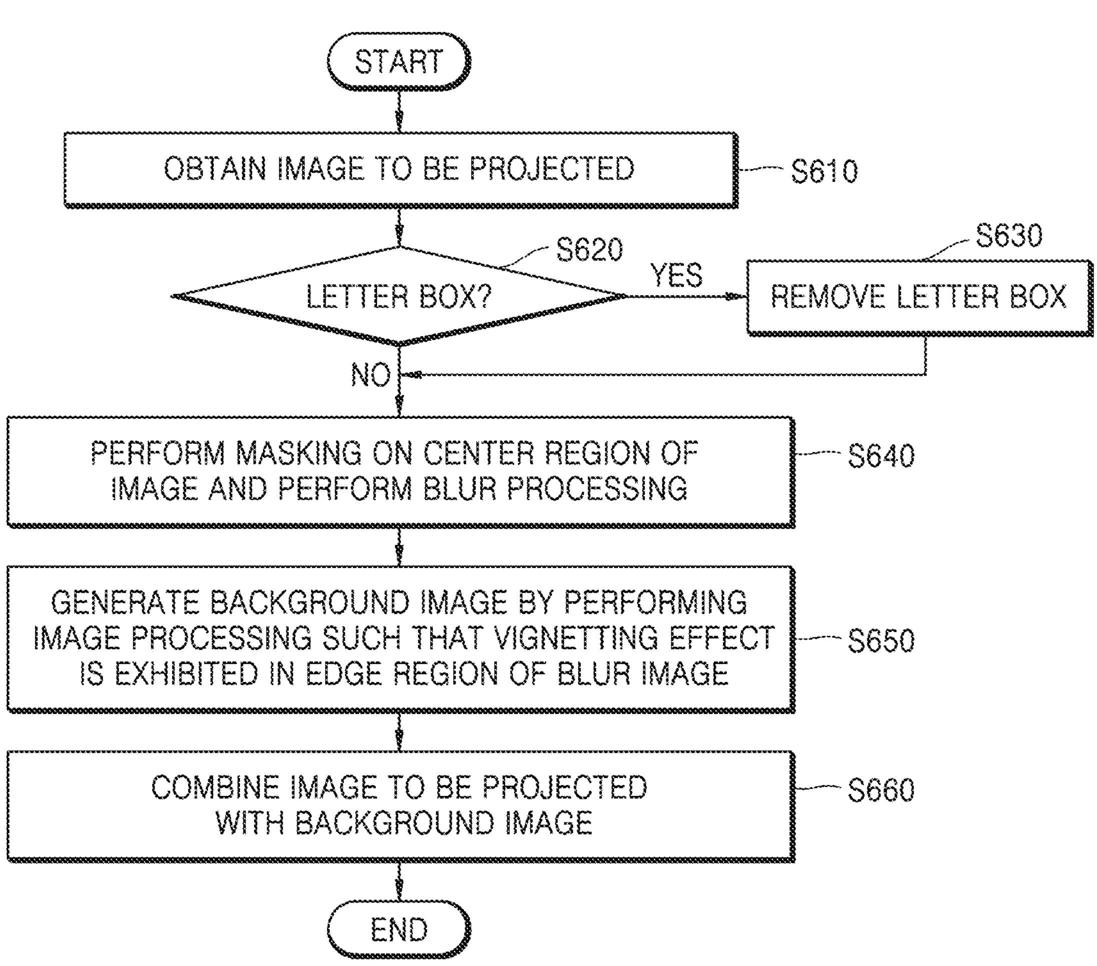
FIG. 6 is a flowchart of a method by which a projection device generates an image including a vignetting effect, according to an embodiment of the disclosure.
Figure 7:
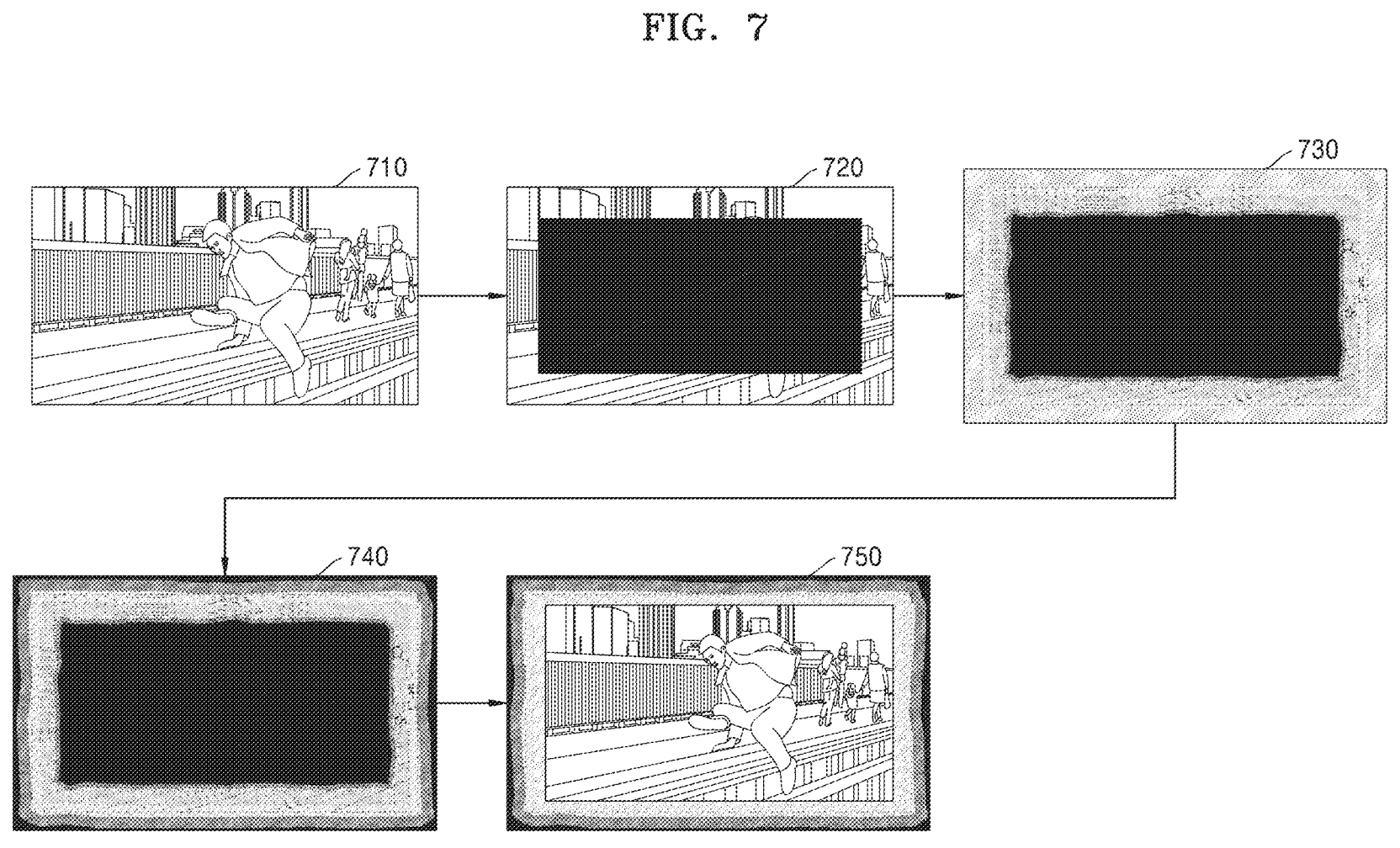

FIG. 6 is a flowchart of a method by which the projection device 100 generates an image including a vignetting effect, according to an embodiment of the disclosure, and FIG. 7 is a reference diagram for describing FIG. 6.

Referring to FIGS. 6 and 7, the projection device 100 according to an embodiment of the disclosure may obtain an image 710 to be projected (operation S610).

The projection device 100 according to an embodiment of the disclosure may determine whether the image 710 includes a letter box (operation S620), and when the letter box is included, remove the letter box from the image 710 (operation S630).

The projection device 100 according to an embodiment of the disclosure may generate a blur image 730 by performing masking on an intermediate region 720 of the image 710 that does not include the letter box or from which the letter box has been removed and performing blur processing thereon (operation S640).

The projection device 100 may perform the blur processing on the image 710 through filtering. Blur processing using a filter has been described in detail above with reference to operation S220 of FIG. 2, and thus, detailed description thereof is not provided again.

During the blur processing, the masked region 720 obtained by masking the center region of the image 710 does not require the blur processing, and thus, an overall throughput may be reduced. A size of the masked region 720 may be adjusted according to a size of the image 710.

The projection device 100 according to an embodiment of the disclosure may generate a background image 740 by performing image processing such that a vignetting effect is exhibited in an edge region of the blur image 730 (operation S650).

The projection device 100 may generate the vignetting effect by generating a shadow (shade) in the edge region of the blur image 730. Here, the projection device 100 may differently apply a vignetting ratio according to locations of the edge region. Because this has been described in detail with reference to FIG. 5, redundant descriptions are not provided again.

The projection device 100 according to an embodiment of the disclosure may combine the image 710 to be projected with the background image 740 (operation S660).

The projection device 100 may generate a final image 750 by scaling the background image 740 or the image 710 to be projected, based on a size of a screen. Here, the final image 750 may be an image exhibiting the vignetting effect in a peripheral region of an edge of the image 710 to be projected.

The projection device 100 according to an embodiment of the disclosure may project the final image 750 including the vignetting effect on the screen or a space.

Figure 8:
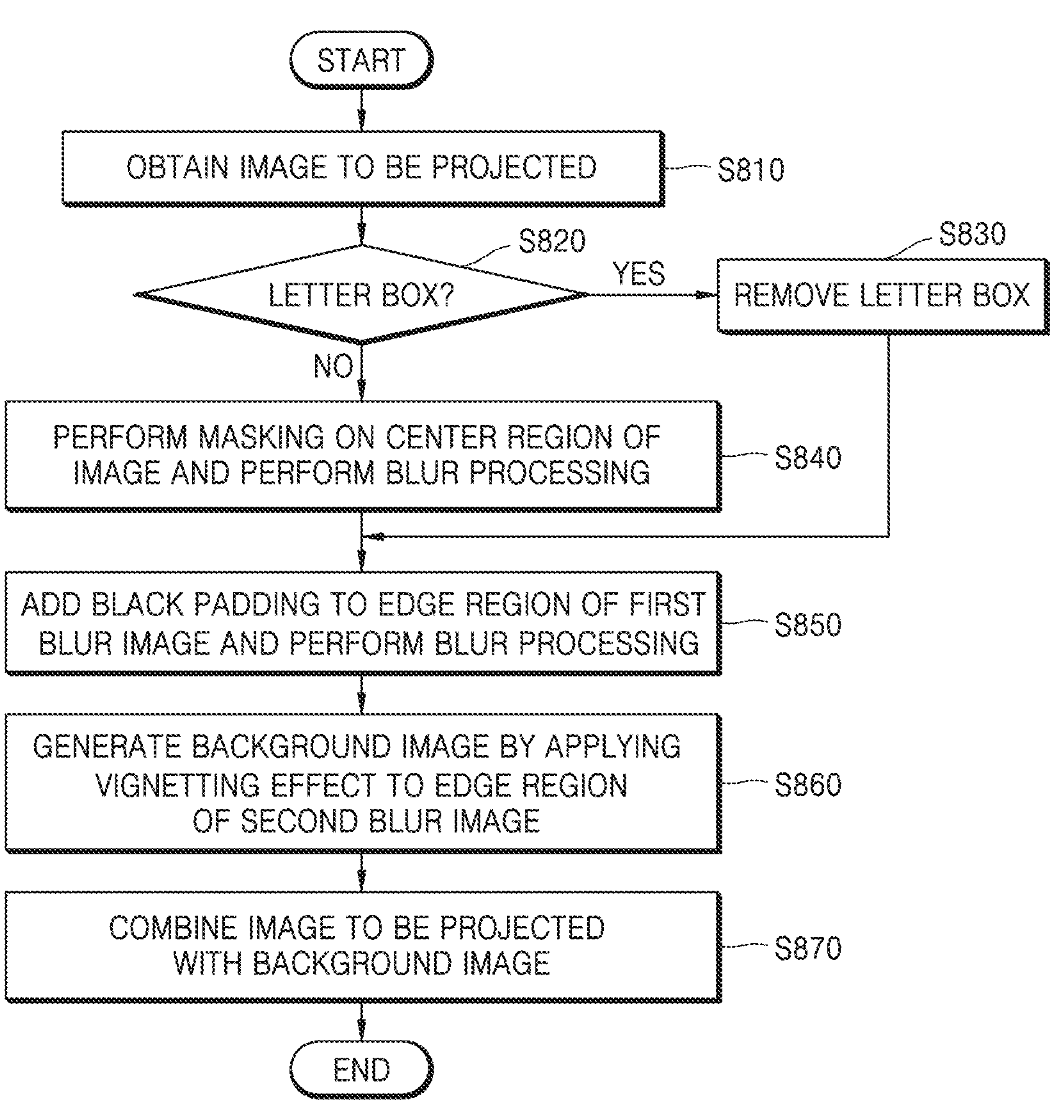
FIG. 8 is a flowchart of a method by which a projection device generates an image including a vignetting effect, according to an embodiment of the disclosure.

FIG. 8 is a flowchart of a method by which the projection device 100 generates an image including a vignetting effect, according to an embodiment of the disclosure.

Referring to FIG. 8, the projection device 100 according to an embodiment of the disclosure may obtain an image to be projected (operation S810).

The projection device 100 according to an embodiment of the disclosure may determine whether the image includes a letter box (operation S820), and when the letter box is included, remove the letter box from the image (operation S830).

The projection device 100 according to an embodiment of the disclosure may generate a first blur image by performing masking on a center region of the image that does not include the letter box or from which the letter box has been removed and performing blur processing thereon (operation S840).

The projection device 100 may perform the blur processing on the image through filtering. Blur processing using a filter has been described in detail above with reference to operation S220 of FIG. 2, and thus, detailed description thereof is not provided again.

During the blur processing, a masked region obtained by masking the center region of the image does not require the blur processing, and thus, an overall throughput may be reduced. A size of the masked region may be adjusted according to a size of the image.

The projection device 100 according to an embodiment of the disclosure may generate a second blur image by adding black padding to top, bottom, left, and right regions of the first blur image and performing blur processing on the first blur image to which the black padding has been added (operation S850).

During the blur processing, a masked region obtained by masking the center region of the image does not require the blur processing, and thus, an overall throughput may be reduced. The size of the masked region may be adjusted according to the size of the image.

The second blur image generated through the blur processing may include a vignetting effect due to the black padding.

The projection device 100 according to an embodiment of the disclosure may generate a background image by performing image processing such that an additional vignetting effect is exhibited in an edge region of the second blur image (operation S860).

The projection device 100 may generate the vignetting effect by generating a shadow (shade) in the edge region of the second blur image. Here, the projection device 100 may differently apply a vignetting ratio according to locations of the edge region. Because this has been described in detail with reference to FIG. 5, redundant descriptions are not provided again.

The projection device 100 according to an embodiment of the disclosure may combine the image to be projected with the background image (operation S870).

The projection device 100 may generate a final image by scaling the background image or the image to be projected, based on a size of a screen. Here, the final image may be an image exhibiting the vignetting effect in a peripheral region of an edge of the image to be projected.

The projection device 100 according to an embodiment of the disclosure may project the final image including the vignetting effect on the screen or a space.

Figure 9:
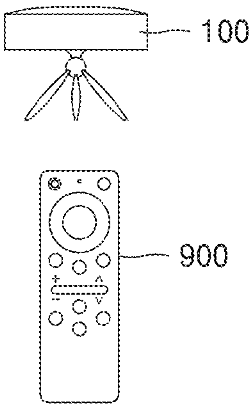
FIG. 9 is a diagram for describing an operation by which a projection device sets a background image, according to an embodiment of the disclosure.

FIG. 9 is a diagram for describing an operation by which the projection device 100 sets a background image, according to an embodiment of the disclosure.

Referring to FIG. 9, the projection device 100 according to an embodiment of the disclosure may set a background original image on which blur processing is to be performed. The projection device 100 according to an embodiment of the disclosure may project a setting menu screen 910 for a background image, on a screen or a space. A setting menu screen according to an embodiment of the disclosure may include menus for setting the background original image on which blur processing is to be performed.

The projection device 100 according to an embodiment of the disclosure may receive a user input of selecting menus through a control device 900, and set the background original image, based on the user input.

The setting menu screen 910 may include a first menu 920 for setting an image to be projected as the background original image. When an on/off button included in the first menu 920 is set to "on", the projection device 100 may generate a blur image by performing blur processing on the image to be projected.

Also, the setting menu screen 910 may include a second menu 930 for turning an automatic setting function on or off. When the automatic setting function is turned on, the projection device 100 may analyze the image to be projected to extract an atmosphere, a theme, or the like of the image to be projected, and generate the background original image corresponding to the extracted atmosphere, theme, or the like or receive the background original image from an external device. However, embodiments of the disclosure are not limited thereto.

Also, the setting menu screen 910 may include a third menu 940 for a user to set an atmosphere, a theme, or the like of the background original image. The user may use the third menu 940 to directly set the atmosphere, the theme, or the like of the background original image. When the atmosphere, the theme, or the like of the background original image is set by the user, the projection device 100 may generate the background original image corresponding to the set atmosphere, theme, or the like, or receive the background original image from the external device. However, embodiments of the disclosure are not limited thereto.

Figure 10:
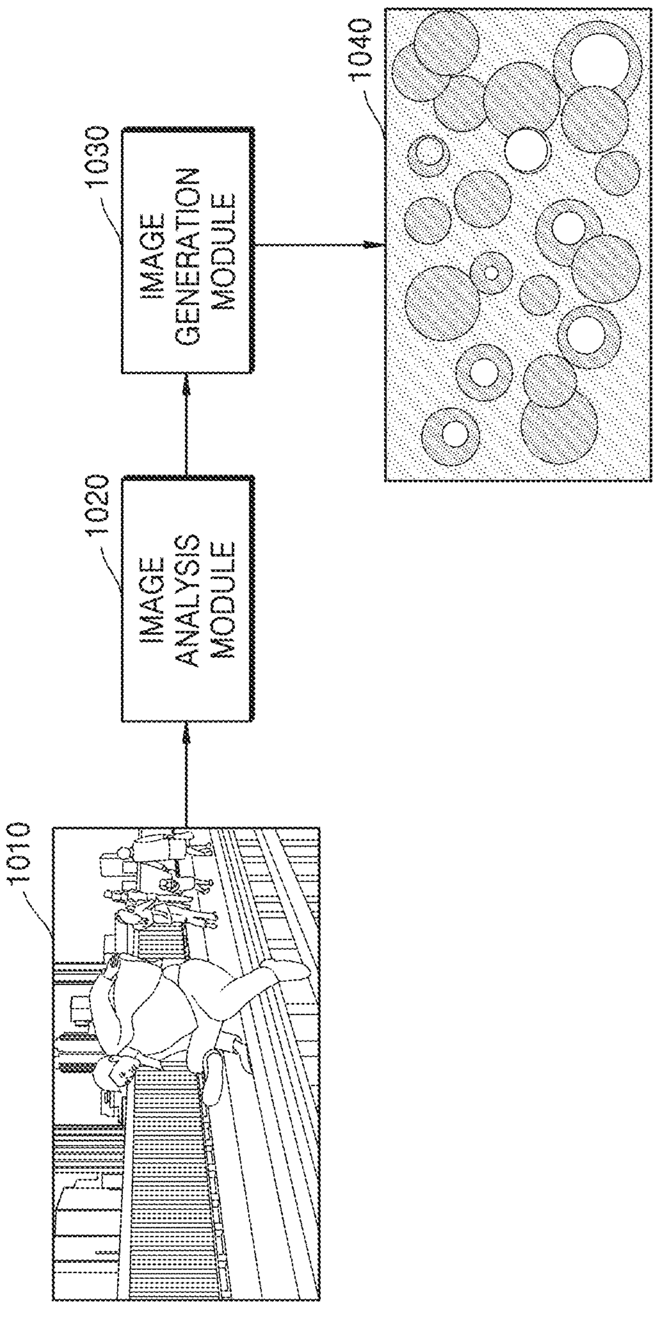
FIG. 10 is a diagram for describing an operation by which a projection device generates a background original image, based on an image to be projected, according to an embodiment of the disclosure.

FIG. 10 is a diagram for describing an operation by which the projection device 100 generates a background original image 1040, based on an image 1010 to be projected, according to an embodiment of the disclosure.

Referring to FIG. 10, the projection device 100 according to an embodiment of the disclosure may include an image analysis module 1020 configured to analyze the image 1010 to be projected and obtain information about an atmosphere, a theme, or the like of the image 1010. The image analysis module 1020 may include a suitable logic, circuit, interface, and/or code to analyze the image 1010 and obtain the information about the atmosphere, the theme, or the like of the image 1010.

The image analysis module 1020 may analyze feelings of colors, lighting, tone, and the like of the image 1010 and obtain the information about the atmosphere of the image 1010, which represents an overall tone or feeling of the image 1010 related to emotions, feelings, and the like conveyed to a viewer. Also, the image analysis module 1020 may extract information about an object included in the image 1010 and obtain the information about the theme or the like of the image 1010. However, embodiments of the disclosure are not limited thereto.

The image analysis module 1020 may include one or more neural networks. The image analysis module 1020 according to an embodiment of the disclosure may obtain the information about the atmosphere, the theme, or the like of the image 1010 by using the one or more neural networks. For example, the image analysis module 1020 may input the image 1010 to the one or more neural networks and output the information about the atmosphere, the theme, or the like of the image 1010 as result data.

The neural network needs to be trained according to purposes for the neural network to accurately output result data corresponding to input data. Here, the training may indicate that various types of data are input to the neural network and the neural network is trained such that the neural network discovers or learns, by itself, a method of analyzing the input data, a method of classifying the input data, and/or a method of extracting a feature to generate result data from the input data. In detail, through the training, the neural network may learn training data, and optimize and set weight values in the neural network. Then, the neural network having the optimized weight value learns, by itself, the input data and outputs a target result.

For example, through the training, the weight values in the one or more neural networks may be optimized so that the one or more neural networks analyze an image and output information about an atmosphere, a theme, or the like of the image. Accordingly, the one or more neural networks that have been trained may receive an image and output information about an atmosphere, a theme, or the like of the image through various methods.

The projection device 100 according to an embodiment of the disclosure may include an image generation module 1030 configured to generate the background original image 1040, based on information obtained by analyzing the image 1010 (e.g., the information about the atmosphere, the theme, or the like of the image 1010).

The image generation module 1030 may include a suitable logic, circuit, interface, and/or code to generate the background original image 1040, based on the information obtained by analyzing the image 1010.

The image generation module 1030 may include one or more neural networks. The image generation module 1030 according to an embodiment of the disclosure may generate the background original image 1040 by using the one or more neural networks. For example, the image generation module 1030 may output the background original image 1040 as result data by inputting, to the one or more neural networks, the information obtained by analyzing the image 1010 (e.g., the information about the atmosphere, the theme, or the like of the image 1010).

For example, through training, weight values in the one or more neural networks may be optimized so that the one or more neural networks output a generated background original image, based on information obtained by analyzing an image (e.g., information about an atmosphere, a theme, or the like of the image). Accordingly, the one or more neural networks that have been trained may receive information obtained by analyzing an image (e.g., information about an atmosphere, a theme, or the like of the image) and output a background original image through various methods. However, embodiments of the disclosure are not limited thereto.

The projection device 100 according to an embodiment of the disclosure may generate a blur image by performing blur processing on the background original image 1040. A method of performing the blur processing has been described in detail above with reference to operation S220 of FIG. 2, and thus, detailed description thereof is not provided again.

The projection device 100 may generate a background image by performing image processing such that a vignetting effect is exhibited in an edge region of the blur image. The projection device 100 may generate the vignetting effect by generating a shadow (shade) in the edge region of the blur image. This has been described in detail above with reference to operation S230 of FIG. 2, and thus, detailed description thereof is not provided again.

Figure 11:
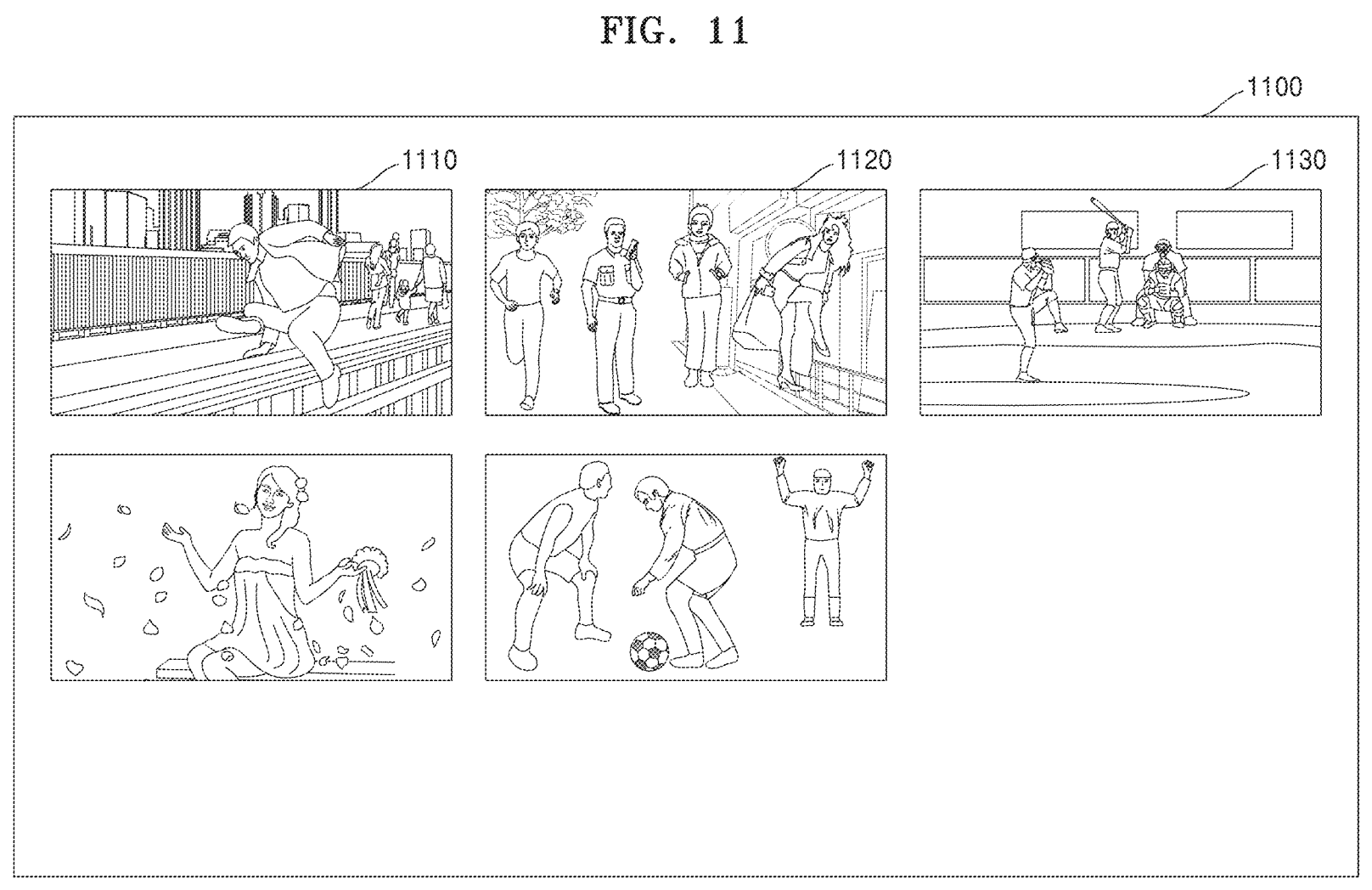

FIG. 11 is a diagram for describing an operation by which the projection device 100 generates a background image, according to an embodiment of the disclosure.

Referring to FIG. 11, an image to be projected may be an image included in a slide show 1100. The projection device 100 according to an embodiment of the disclosure may generate a background image by using one of other images included in the slide show 1100.

For example, when a first image 1110 included in the slide show 1100 is projected, a first blur image may be generated by performing blur processing on a second image 1120 included the same slide show 1100. The projection device 100 may generate a first background image by performing image processing so that a vignetting effect is included in the generated first blur image. The projection device 100 may project an image in which the first background image is combined with the first image 1110 on a screen or a space.

When the second image 1120 included in the slide show 1100 is projected, a second blur image may be generated by performing blur processing on a third image 1130 included in the same slide show 1100. The projection device 100 may generate a second background image by performing image processing so that a vignetting effect is included in the generated second blur image. The projection device 100 may project an image in which the second background image is combined with the second image 1120 on the screen or the space.

Figure 12:
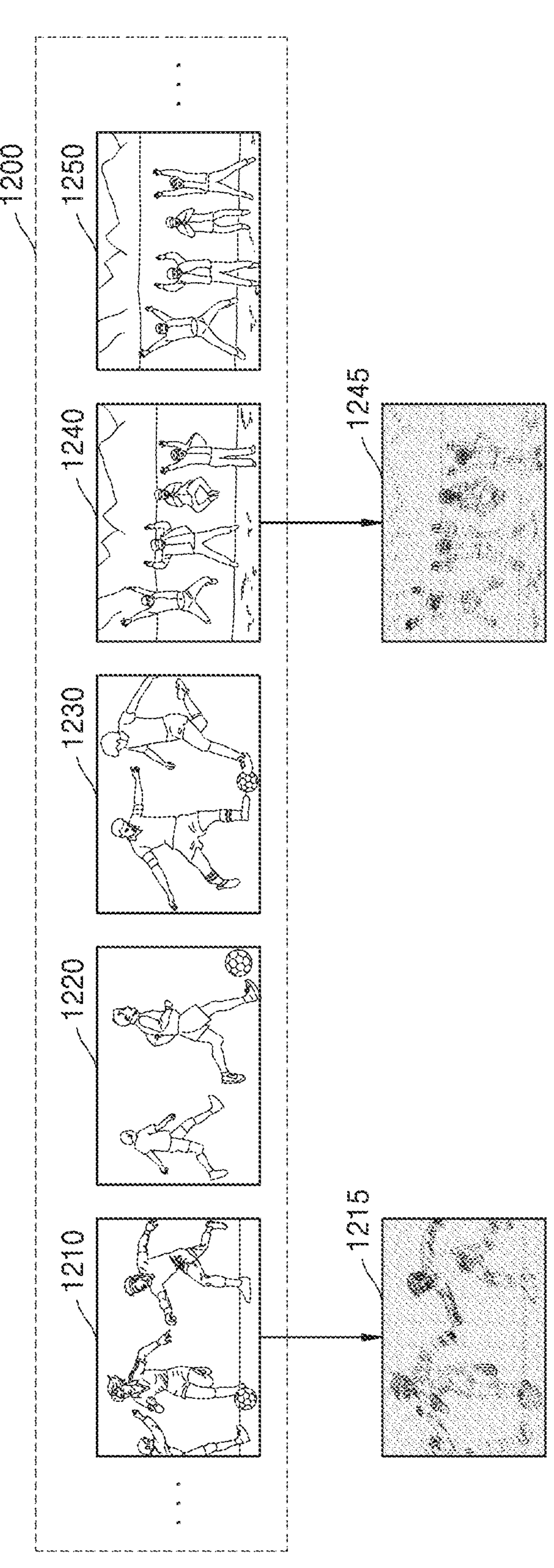
FIG. 12 is a diagram for describing an operation by which a projection device generates a background image, according to an embodiment of the disclosure.

FIG. 12 is a diagram for describing an operation by which the projection device 100 generates a background image, according to an embodiment of the disclosure.

Referring to FIG. 12, the projection device 100 according to an embodiment of the disclosure may project video content 1200 including a plurality of frame images. The projection device 100 according to an embodiment of the disclosure may detect a frame image, in which a scene changes, from among the plurality of frame images included in the video content 1200, and generate a blur image by using the frame image, in which a scene changes.

The projection device 100 according to an embodiment of the disclosure may extract a feature from each of the plurality of frame images and detect a scene change, based on a difference between the extracted features. However, embodiments of the disclosure are not limited thereto.

For example, as shown in FIG. 12, the projection device 100 may detect a scene change from a first frame image 1210. The projection device 100 may generate a first blur image 1215 by performing blur processing on the first frame image 1210. The projection device 100 may generate a first background image by performing image processing so that a vignetting effect is included in the generated first blur image 1215. The projection device 100 may project an image in which the first background image is combined with the first frame image 1210 on a screen or a space.

When there are no scene changes in a second frame image 1220 and a third frame image 1230, the projection device 100 may generate a second background image and a third background image by performing image processing so that a vignetting effect is included in the first blur image 1215. The projection device 100 may project, on the screen or the space, an image in which the second background image is combined with the second frame image 1220 and an image in which the third background image is combined with the third frame image 1230.

Also, when a scene change is detected in a fourth frame image 1240, the projection device 100 may generate a second blur image 1245 by performing blur processing on the fourth frame image 1240. The projection device 100 may generate a fourth background image by performing image processing so that a vignetting effect is included in the generated second blur image 1245. The projection device 100 may project an image in which the fourth background image is combined with the fourth frame image 1240 on the screen or the space.

When there is no scene change in a fifth frame image 1250, the projection device 100 may generate a fifth background image by performing image processing so that a vignetting effect is included in the second blur image 1245. The projection device 100 may project an image in which the fifth background image is combined with the fifth frame image 1250 on the screen or the space.

Figure 13:
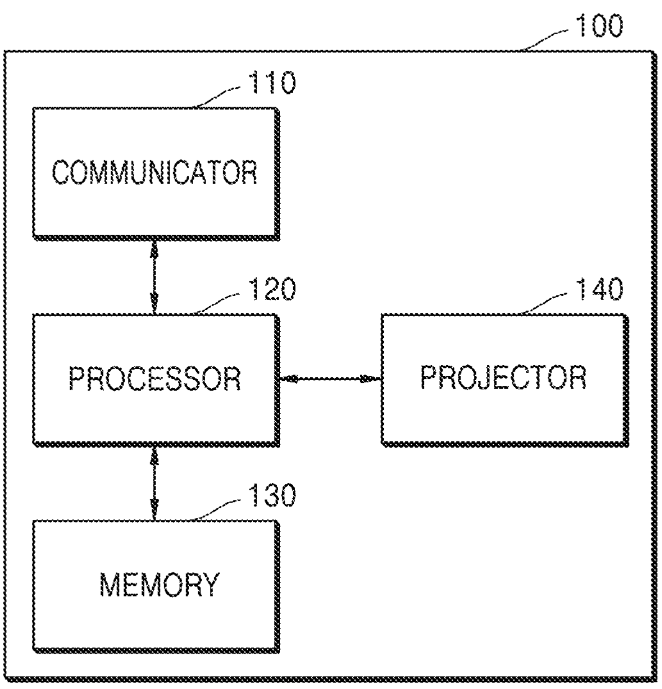
FIG. 13 is a block diagram of a configuration of a projection device, according to an embodiment of the disclosure.

FIG. 13 is a block diagram of a configuration of the projection device 100, according to an embodiment of the disclosure.

Referring to FIG. 13, the projection device 100 according to an embodiment of the disclosure may include a communicator 110, a processor 120, a memory 130, and a projector 140.

The communicator 110 according to an embodiment of the disclosure may transmit and receive data or a signal to and from an external device or a server. For example, the communicator 110 may include a Wi-Fi module, a Bluetooth module, an infrared communication module, a wireless communication module, a local area network (LAN) module, an Ethernet module, or a wired communication module. Here, each communication module may be implemented in the form of at least one hardware chip.

The Wi-Fi module and the Bluetooth module may communicate through a W-Fi method and a Bluetooth method, respectively. When the Wi-Fi module or the Bluetooth module is used, various types of connection information, such as service set identifier (SSID) or a session key, may be transmitted or received first, communication may be connected by using the same, and then various types of information may be transmitted or received. The wireless communication module may include at least one communication chip performing communication according to various wireless communication standards, such as ZigBee, 3rd generation (3G), 3rd generation partnership project (3GPP), long-term evolution (LTE), LTE advanced (LTE-A), 4th generation (4G), and 5th generation (5G).

The communicator 110 according to an embodiment of the disclosure may receive, from the external device, an image to be projected or image content. The communicator 110 according to an embodiment of the disclosure may communicate with a control device. The communicator 110 may receive, from the control device, a signal corresponding to a user input.

The processor 120 according to an embodiment of the disclosure may control overall operations of the projection device 100 and a signal flow between internal components of the projection device 100, and perform a function of processing data.

The processor 120 may include a single core, a dual core, a triple core, a quad core, or a multiple core. Also, the processor 120 may include a single processor or a plurality of processors. For example, the processor 120 may be implemented by a main processor and a sub processor.

Also, the processor 120 may include at least one of a central processing unit (CPU), a graphics processing unit (GPU), or a video processing unit (VPU). According to an embodiment of the disclosure, the processor 120 may be implemented in the form of a system-on-chip (SoC) in which at least one of CPU, GPU, or VPU is integrated. The processor 120 may further include a neural processing unit (NPU).

The memory 130 may include a single memory or a plurality of memories. The memory 130 according to an embodiment of the disclosure may store various types of data, programs, or applications for driving and controlling the projection device 100.

Also, the program stored in the memory 130 may include one or more instructions. The program (one or more instructions) or application stored in the memory 130 may be executed by the processor 120.

The processor 120 according to an embodiment of the disclosure may be configured to execute the one or more instructions stored in the memory 130 to obtain an image to be projected. The image according to an embodiment of the disclosure may be an image pre-stored in the memory 130 or an image received from the external device through the communicator 110. Also, the image may be an image on which various types of image processing have been performed by a video processor, such as decoding, scaling, noise filtering, frame rate conversion, resolution conversion, and the like.

The processor 120 according to an embodiment of the disclosure may be configured to execute the one or more instructions stored in the memory 130 to generate a blur image, based on the image. For example, the processor 120 may generate the blur image by performing blur processing on the image. Here, blurring or blur processing may be performed to blur an image by reducing sharpness of the image and providing a soft blurring effect.

The processor 120 according to an embodiment of the disclosure may perform the blur processing on the image by performing filtering. The processor 120 may perform the filtering on the image by using various filters. For example, the processor 120 may perform blur processing (Gaussian blurring) by using a Gaussian filter, blur processing (average blurring) by using an average filter, and blur processing (median blurring) by using a median filter. Such filters are only examples and the processor 120 according to an embodiment of the disclosure may perform blur processing by using various filters.

The processor 120 may obtain an image to be blurred (e.g., a background original image), based on the image to be projected. For example, the processor 120 may analyze the image to be projected to obtain information about an atmosphere, a theme, and the like indicated in the image, and generate the background original image, based on the obtained information. The processor 120 may receive the background original image corresponding to the obtained information, from the external device through the communicator 110. The processor 120 may generate the blur image by performing blur processing on the background original image.

The processor 120 may generate the blur image by performing blur processing on another image associated with the image to be projected. For example, the other image associated with the image to be projected may include another image stored in a same region as the image to be projected, another image classified as a same group as the image to be projected, according to a specific standard, another image having a same or similar atmosphere as the image to be projected, and another image indicating a same or similar theme as the image to be projected. However, embodiments of the disclosure are not limited thereto.

The processor 120 according to an embodiment of the disclosure may be configured to execute the one or more instructions stored in the memory 130 to generate a background image by performing image processing such that a vignetting effect is exhibited in an edge of the blur image.

The processor 120 according to an embodiment of the disclosure may generate the vignetting effect by generating a shadow (shade) in the edge region of the blur image. Here, the processor 120 may differently apply a vignetting ratio according to locations of the edge region. The vignetting ratio is a value indicating a degree of vignetting, and when the value increases, a dark region is increase, and when the value decreases, the dark region is decreased.

The processor 120 according to an embodiment of the disclosure may differently apply the vignetting ratio applied to the blur image according to time. Accordingly, the vignetting effect exhibited in an edge region of the background image may vary over time.

The processor 120 according to an embodiment of the disclosure may be configured to execute the one or more instructions stored in the memory 130 to combine the image to be projected with the background image. For example, the processor 120 may generate a final image by combining the image to be projected with the generated background image. Here, the processor 120 may generate the final image by scaling the background image or the image to be projected, based on a size of a screen. The final image may be an image exhibiting the vignetting effect in a peripheral region of an edge of the image to be projected.

The processor 120 may control the projector 140 to project the final image in which the background image and the image to be projected are combined, on the screen or the space.

The projector 140 according to an embodiment of the disclosure may include a light source configured to generate light, a lens, or the like, and may further include a driver configured to adjust a direction, a location, an angle, or the like of projection. The projector 140 may project the final image by driving the light source or adjusting the direction, the location, the angle, or the like of the projection, according to a control signal received from the processor 120.

The vignetting effect is exhibited in the peripheral region of the edge of the image to be projected, according to an embodiment of the disclosure, and thus, a user or a viewer watching an image may further concentrate on watching the image and have a viewing experience as if a space on which the image is projected and a real space are connected to each other.

The block diagram of the projection device 100 shown in FIG. 13 is a block diagram according to an embodiment of the disclosure. Components of the block diagram may be integrated, a component may be added, or a component may be omitted according to the specification of the projection device 100 actually implemented. In other words, two or more components may be integrated into one component or one component may be divided into two or more components when necessary. Also, a function performed by each block is only for describing embodiments of the disclosure and specific operations or devices do not limit the scope of right of the disclosure.

Figure 14:
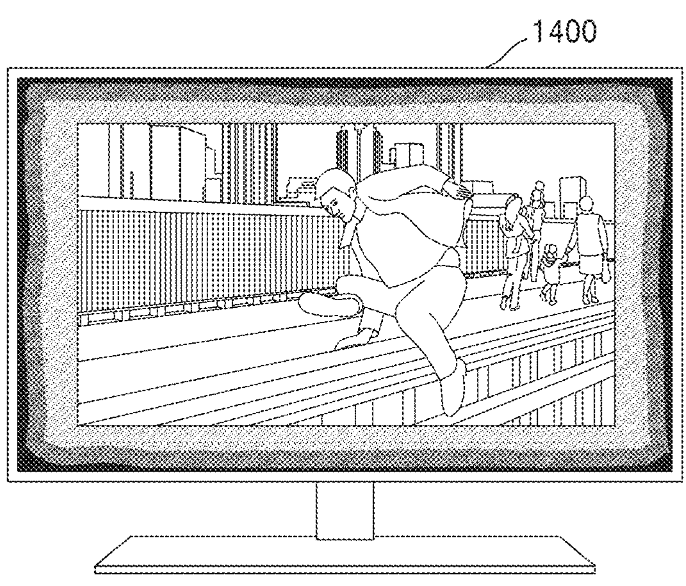
FIG. 14 is a diagram illustrating a display device for displaying an image including a vignetting effect, according to an embodiment of the disclosure.

FIG. 14 is a diagram illustrating a display device 1400 for displaying an image including a vignetting effect, according to an embodiment of the disclosure.

Referring to FIG. 14, the display device 1400 according to an embodiment of the disclosure is a device configured to process an image signal and display an image, and may include a display.

The display device 1400 according to an embodiment of the disclosure may be implemented in any one of various forms, such as a television (TV) including a display, a smart monitor, a mobile phone, a smartphone, a tablet personal computer (PC), a digital camera, a camcorder, a laptop computer, a desktop computer, an electronic book terminal, a digital broadcasting terminal, a personal digital assistant (PDA), a portable multimedia player (PMP), a navigation device, an MP3 player, a digital video disk (DVD) player, a wearable device, a video wall, a digital signage, a digital information display (DID), a projector display, a refrigerator, and a washing machine. Also, the display device 1400 may be a fixed electronic device arranged at a fixed location or a mobile electronic device in a portable form, and may be a digital broadcast receiver capable of receiving a digital broadcast. However, the display device 1400 is not limited thereto.

The display device 1400 according to an embodiment of the disclosure may provide a vignetting effect to an image displayed on the display. The display device 1400 according to an embodiment of the disclosure may perform same operations as the projection device 100 described with reference to FIGS. 1 to 13.

For example, the display device 1400 may generate a blur image, based on an image to be displayed and generate a background image by performing image processing such that a vignetting effect is exhibited in an edge region of the blur image. The display device 1400 may combine the image to be displayed with the background image and display a synthesized image on the display.

The display device 1400 according to an embodiment of the disclosure may determine whether to apply a vignetting effect, based on a user input. For example, when a vignetting function of applying a vignetting effect is activated based on a user input, the display device 1400 may process an image displayed on the display such that a vignetting effect is exhibited in an edge region of the image.

The display device 1400 may determine whether to apply a vignetting effect, based on surrounding illumination. For example, the display device 1400 may obtain illumination information of the surrounding of the display device 1400 and when a surrounding illumination value is a threshold value or lower (when an image viewing environment is dark), the display device 1400 may process an image displayed on the display such that a vignetting effect is exhibited in an edge region of the image.

Figure 15:
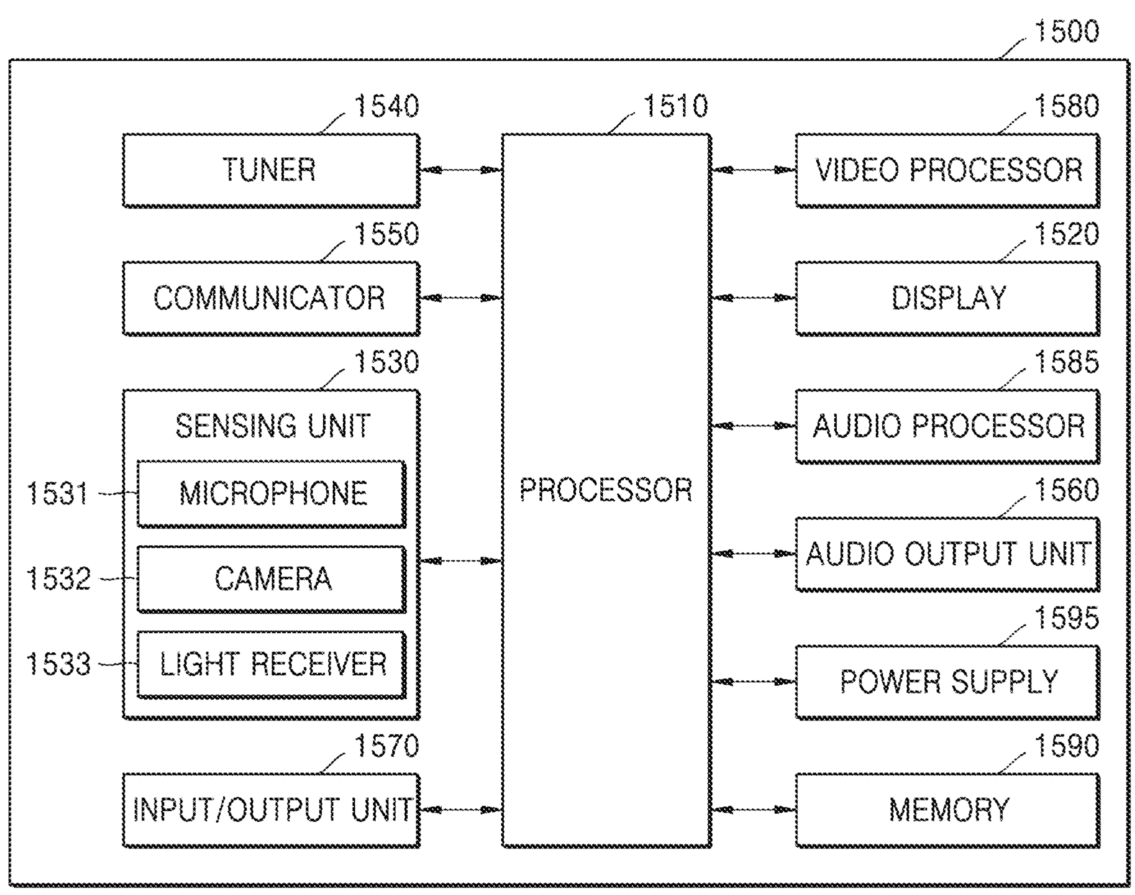
FIG. 15 is a block diagram of a configuration of a display device, according to an embodiment of the disclosure.

FIG. 15 is a block diagram of a configuration of a display device 1500, according to an embodiment of the disclosure.

The display device 1500 of FIG. 15 may be an example of the display device 1400 of FIG. 14.

Referring to FIG. 15, the display device 1500 according to an embodiment of the disclosure may include a tuner 1540, a processor 1510, a display 1520, a communicator 1550, a sensing unit 1530, an input/output unit 1570, a video processor 1580, an audio processor 1585, an audio output unit 1560, a memory 1590, and a power supply 1595.

The tuner 1540 according to an embodiment of the disclosure may tune and select only a frequency of a channel to be received by the display device 1500 among many radio wave components by performing amplification, mixing, and resonance on a broadcast signal received via wires or wirelessly. The broadcast signal includes audio, video, and additional information (for example, an electronic program guide (EPG)).

The tuner 1540 may receive a broadcast signal from various sources, such as terrestrial broadcasting, cable broadcasting, satellite broadcasting, and Internet broadcasting. The tuner 1540 may receive a broadcast signal from a source such as analog broadcasting or digital broadcasting.

The communicator 1550 according to an embodiment of the disclosure may transmit and receive data or a signal to and from an external device or a server. For example, the communicator 1550 may include a Wi-Fi module, a Bluetooth module, an infrared communication module, a wireless communication module, a local area network (LAN) module, an Ethernet module, or a wired communication module. Here, each communication module may be implemented in the form of at least one hardware chip.

The Wi-Fi module and the Bluetooth module may communicate through a W-Fi method and a Bluetooth method, respectively. When the Wi-Fi module or the Bluetooth module is used, various types of connection information, such as SSID or a session key, may be transmitted or received first, communication may be connected by using the same, and then various types of information may be transmitted or received. The wireless communication module may include at least one communication chip performing communication according to various wireless communication standards, such as ZigBee, 3G, 3GPP, LTE, LTE-A, 4G, and 5G.

The communicator 1550 according to an embodiment of the disclosure may receive, from an external control device, a control signal or a control command. For example, the communicator 1550 may include an infrared (IR) module configured to transmit and receive a signal to and from the external control device according to IR communication standards. In detail, the communicator 1550 may receive, from a control device, a control signal or a control command corresponding to a user input (e.g., a key or button input of the control device).

The sensing unit 1530 according to an embodiment of the disclosure may detect a speech of a user, an image of the user, or an interaction of the user, and may include a microphone 1531, a camera 1532, and a light receiver 1533.

A microphone 1531 receives a speech uttered by the user. The microphone 1531 may convert the received speech into an electric signal and output the electric signal to the processor 1510. The user's speech may include, for example, a speech corresponding to a menu or function of the display device 1500. For example, the microphone 1531 may receive the user's speech corresponding to a rotation command of the display 1520, convert the received speech into an electric signal, and output the electric signal to the processor 1510.

The camera 1532 may receive an image (for example, consecutive frames) corresponding to motion of the user including a gesture within a camera recognition range. The processor 1510 may select a menu displayed on the display device 1500 by using a result of recognizing the received motion or perform control corresponding to the result. For example, the processor 1510 may receive an image from the camera 1532, recognize the user's motion corresponding to rotation of the display 1520 from the received image, and rotate the display 1520, based on the recognized user's motion.

The light receiver 1533 receives an optical signal (including a control signal) received from the external control device through a light window of a bezel of the display 1520. The light receiver 1533 may receive an optical signal corresponding to a user input (for example, touch, press, touch gesture, speech, or motion) from the control device. A control signal may be extracted from the received light signal under control by the processor 1510.

The input/output unit 1570 according to an embodiment of the disclosure may receive video (e.g., a moving image), audio (e.g., speech or music), and additional information (e.g., electronic program guide (EPG)) from the outside of the display device 1500. The input/output unit 1570 may include any one of a high-definition multimedia interface (HDMI), a mobile high-definition link (MHL), a universal serial bus (USB), a display port (DP), a thunderbolt, a video graphics array (VGA) port, an RGB port, a D-subminiature (D-SUB), a digital visual interface (DVI), a component jack, and a PC port.

The video processor 1580 according to an embodiment of the disclosure performs processing on video data received by the display device 1500. The video processor 1580 may perform various image processing, such as decoding, scaling, noise filtering, frame rate conversion, and resolution conversion, on the video data.

The processor 1510 may include a single core, a dual core, a triple core, a quad core, or a multiple core. Also, the processor 1510 may include a plurality of processors. For example, the processor 1510 may include a main processor and a sub-processor operating in a sleep mode.

Also, the processor 1510 may include at least one of a CPU, a GPU, or a VPU. According to an embodiment of the disclosure, the processor 1510 may be implemented in the form of a SoC in which at least one of CPU, GPU, or VPU is integrated. The processor 1510 may further include an NPU.

The processor 1510 may include random access memory (RAM) storing a signal or data input from the outside of the display device 1500 or used as a storage area corresponding to various tasks performed by the display device 1500, read-only memory (ROM) storing a control program for control by the display device 1500, and a processor.

The memory 1590 according to an embodiment of the disclosure may store various types of data, programs, or applications for driving and controlling the display device 1500.

Also, the program stored in the memory 1590 may include one or more instructions. The program (one or more instructions) or application stored in the memory 1590 may be executed by the processor 1510.

The processor 1510 according to an embodiment of the disclosure may be configured to execute the one or more instructions stored in the memory 1590 to obtain an image to be displayed. The image according to an embodiment of the disclosure may be an image pre-stored in the memory 1590 or an image received from an external device through the tuner 1540 or the communicator 1550. Also, the image may be an image on which various types of image processing have been performed by the video processor 1580, such as decoding, scaling, noise filtering, frame rate conversion, resolution conversion, and the like.

The processor 1510 according to an embodiment of the disclosure may be configured to execute the one or more instructions stored in the memory 1590 to generate a blur image, based on the image. For example, the processor 1510 may generate the blur image by performing blur processing on the image. Here, blurring or blur processing may be performed to blur an image by reducing sharpness of the image and providing a soft blurring effect.

The processor 1510 according to an embodiment of the disclosure may perform the blur processing on the image by performing filtering. The processor 1510 may perform the filtering on the image by using various filters. For example, the processor 1510 may perform blur processing (Gaussian blurring) by using a Gaussian filter, blur processing (average blurring) by using an average filter, and blur processing (median blurring) by using a median filter. Such filters are only examples and the processor 1510 according to an embodiment of the disclosure may perform blur processing by using various filters.

The processor 1510 may obtain an image to be blurred (e.g., a background original image), based on the image to be displayed. For example, the processor 1510 may analyze the image to be displayed to obtain information about an atmosphere, a theme, and the like indicated in the image, and generate the background original image, based on the obtained information. The processor 1510 may receive the background original image corresponding to the obtained information, from the external device through the communicator 1550. The processor 1510 may generate the blur image by performing blur processing on the background original image.

The processor 1510 may generate the blur image by performing blur processing on another image associated with the image to be displayed. For example, the other image associated with the image to be displayed may include another image stored in a same region as the image to be displayed, another image classified as a same group as the image to be displayed, according to a specific standard, another image having a same or similar atmosphere as the image to be displayed, and another image indicating a same or similar theme as the image to be displayed. However, embodiments of the disclosure are not limited thereto.

The processor 1510 according to an embodiment of the disclosure may be configured to execute the one or more instructions stored in the memory 1590 to generate a background image by performing image processing such that a vignetting effect is exhibited in an edge of the blur image.

The processor 1510 according to an embodiment of the disclosure may generate the vignetting effect by generating a shadow (shade) in the edge region of the blur image. Here, the processor 1510 may differently apply a vignetting ratio according to locations of the edge region. The vignetting ratio is a value indicating a degree of vignetting, and when the value increases, a dark region is increase, and when the value decreases, the dark region is decreased.

The processor 1510 according to an embodiment of the disclosure may differently apply the vignetting ratio applied to the blur image according to time. Accordingly, the vignetting effect exhibited in an edge region of the background image may vary over time.

The processor 1510 according to an embodiment of the disclosure may be configured to execute the one or more instructions stored in the memory 1590 to combine the image to be displayed with the background image. For example, the processor 1510 may generate a final image by combining the image to be displayed with the generated background image. Here, the processor 1510 may generate the final image by scaling the background image or the image to be displayed, based on a size of a screen. The final image may be an image exhibiting the vignetting effect in a peripheral region of an edge of the image to be displayed.

The processor 1510 may control the display 1520 to display the final image in which the background image and the image to be displayed are combined.

The display 1520 according to an embodiment of the disclosure may generate a driving signal by converting an image signal, a data signal, an on-screen display (OSD) signal, or a control signal processed by the processor 1510. The display 1520 may be implemented as a plasma display panel (PDP), a liquid crystal display (LCD), an organic light-emitting diode (OLED), or a flexible display, or may be implemented as a 3-dimensional (3D) display. The display 1520 may be configured as a touch screen to be used as an input device as well as an output device.

The display 1520 according to an embodiment of the disclosure may display the final image in which the background image including the vignetting effect and the image to be displayed are combined, according to control by the processor 1510.

The audio processor 1585 performs processing on audio data. The audio processor 1585 may perform various processing, such as decoding, amplification, or noise filtering, on the audio data. The audio processor 1585 may include a plurality of audio processing modules to process audio corresponding to a plurality of pieces of content.

The audio output unit 1560 outputs audio included in a broadcast signal received through the tuner 1540 under control by the processor 1510. The audio output unit 1560 may output the audio (for example, speech or sound) input through the communicator 1550 or the input/output unit 1570. Also, the audio output unit 1560 may output audio stored in the memory 1590 under control by the processor 1510. The audio output unit 1560 may include at least one of a speaker, a headphone output terminal, or a Sony/Philips digital interface (S/PDIF) terminal.

The power supply 1595 supplies power input from an external power source to components inside the display device 1500 under control by the processor 1510. Also, the power supply 1595 may supply power output from one or more batteries located inside the display device 1500 to the components inside the display device 1500 under control by the processor 1510.

The memory 1590 may store various types of data, programs, or applications for driving and controlling the display device 1500 under control by the processor 1510. The memory 1590 may include a broadcast receiving module, a channel control module, a volume control module, a communication control module, a voice recognition module, a motion recognition module, a light receiving module, a display control module, an audio control module, an external input control module, a power control module, a power control module of an external device connected wirelessly (for example, Bluetooth), a voice database (DB), or a motion DB. Modules and DBs of the memory 1590 may be implemented in the form of software to perform a broadcast receiving control function, a channel control function, a volume control function, a communication control function, a voice recognition function, a motion recognition function, a light receiving control function, a display control function, an audio control function, an external input control function, a power control function, or power control function of an external device connected wirelessly (for example, Bluetooth), in the display device 1500. The processor 1510 may perform each function by using the software stored in the memory 1590.

The block diagram of the display device 1500 shown in FIG. 15 is a block diagram according to an embodiment of the disclosure. Components of the block diagram may be integrated, a component may be added, or a component may be omitted according to the specification of the display device 1500 actually implemented. In other words, two or more components may be integrated into one component or one component may be divided into two or more components when necessary. Also, a function performed by each block is only for describing embodiments of the disclosure and specific operations or devices do not limit the scope of right of the disclosure.

A projection device according to an embodiment of the disclosure may include a projector, a memory storing one or more instructions, and at least one processor configured to execute the one or more instructions.

The at least one processor may be configured to execute the one or more instructions to obtain a first image.

The at least one processor may be configured to execute the one or more instructions to generate a blur image, based on the first image.

The at least one processor may be configured to execute the one or more instructions to obtain a background image by performing image processing on an edge region of the blur image to exhibit a vignetting effect.

The at least one processor may be configured to execute the one or more instructions to control the projector to project a second image in which the background image and the first image are combined.

The at least one processor may be further configured to execute the one or more instructions to perform the image processing by differently applying a vignetting ratio according to locations of the edge region of the blur image.

The at least one processor may be further configured to execute the one or more instructions to perform the image processing such that the vignetting effect exhibited in the edge region of the background image varies over time.

The at least one processor may be further configured to execute the one or more instructions to generate the blur image by performing blur processing on the first image.

The at least one processor may be further configured to execute the one or more instructions to perform masking processing on a center region of the first image, and generate the blur image by performing the blur processing on the first image on which the masking processing has been performed.

The at least one processor may be further configured to execute the one or more instructions to add black padding to an edge of the first image, and generate the blur image by performing the blur processing on the first image to which the black padding has been added.

The at least one processor may be further configured to execute the one or more instructions to, based on the first image including a letter box, remove the letter box from the first image, and generate the blur image by performing blur processing on the first image from which the letter box has been removed.

The at least one processor may be further configured to execute the one or more instructions to obtain a third image, based on the first image, and generate the blur image by performing blur processing on the third image.

The at least one processor may be further configured to execute the one or more instructions to obtain at least one of an atmosphere or a theme of the first image by analyzing the first image, and obtain the third image, based on at least one of the atmosphere or the theme of the first image.

An operating method of a projection device, according to an embodiment of the disclosure, may include obtaining a first image.

The operating method according to an embodiment of the disclosure may include generating a blur image, based on the first image.

The operating method according to an embodiment of the disclosure may include obtaining a background image by performing image processing on an edge region of the blur image to exhibit a vignetting effect.

The operating method according to an embodiment of the disclosure may include projecting a second image in which the background image and the first image are combined.

The obtaining of the background image may include performing the image processing by differently applying a vignetting ratio according to locations of the edge region of the blur image.

The obtaining of the background image may include performing the image processing such that the vignetting effect exhibited in the edge region of the background image varies over time.

The generating of the blur image may include generating the blur image by performing blur processing on the first image.

The generating of the blur image may include performing masking processing on a center region of the first image, and generating the blur image by performing the blur processing on the first image on which the masking processing has been performed.

The generating of the blur image may include adding black padding to an edge of the first image, and generating the blur image by performing the blur processing on the first image to which the black padding has been added.

The operating method may further include, based on the first image including a letter box, removing the letter box from the first image, wherein the generating of the blur image may include generating the blur image by performing blur processing on the first image from which the letter box has been removed.

The generating of the blur image may include obtaining a third image, based on the first image, and generating the blur image by performing blur processing on the third image.

The obtaining of the third image, based on the first image, may include obtaining at least one of an atmosphere or a theme of the first image by analyzing the first image, and obtaining the third image, based on at least one of the atmosphere or the theme of the first image.

A projection device according to an embodiment of the disclosure may provide a vignetting effect by generating a shadow (shade) in an edge region of projected image content.

When the vignetting effect is exhibited in the edge region of the projected image content, a disconnection between a space where the image content is displayed and a space where a viewer exists may be reduced. Accordingly, the viewer may further concentrate on viewing the image content and have a viewing experience as if the image content space and the real space are connected to each other.

An operating method of a projection device or an operating method of a display device, according to an embodiment of the disclosure, may be recorded on a computer-readable recording medium by being implemented in the form of program commands executed by using various computers. The computer-readable recording medium may include at least one of a program command, a data file, or a data structure. The program commands recorded in the computer-readable recording medium may be specially designed or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include machine codes generated by a compiler, and high-level language codes executable by a computer by using an interpreter.

Furthermore, an operating method of a projection device, according to embodiments of the disclosure, may be provided by being included in a computer program product. The computer program products are products that can be traded between sellers and buyers.

The computer program product may include a software program or a computer-readable storage medium storing a software program. For example, the computer program product may include a product (for example, a downloadable application) in the form of a software program that is electronically distributable through a manufacturer of the electronic device or an electronic market (for example, Google PlayStore™ or AppStore™). For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a client device in a system including the server and the client device. When there is a third device, e.g., a smartphone, that communicates with the server or the client device, the computer program product may include a storage medium of the third device. The computer program product may include the software program transmitted from the server to the client device or the third device, or transmitted from the third device to the client device.

In this case, one of the server, the client device, and the third device may perform a method according to embodiments of the disclosure by executing the computer program product. Two or more of the server, the client device, and the third device may execute the computer program product to perform the method according to the embodiments of the disclosure in a distributed fashion.

For example, the server, for example, a cloud server or an artificial intelligence server, may execute the computer program product stored in the server to control the client device communicatively connected to the server to perform the method according to the embodiments of the disclosure.

While the embodiments of the disclosure have been particularly shown and described in detail, it will be understood by one of ordinary skill in the art that various changes in form and details may be made therein without departing from the scope of the disclosure as defined by the following claims.

What is claimed is:

1. A projection device comprising:

a projector;

at least one memory storing one or more instructions; and at least one processor configured to execute the one or more instructions, wherein the one or more instructions, when executed by the at least one processor, cause the projection device to:

obtain a first image;

generate a blur image, based on the first image;

obtain a background image by performing image processing on an edge region of the blur image to exhibit a vignetting effect on the edge region such that a vignetting ratio, which is a ratio of a dark region, varies over time; and control the projector to project a second image in which the background image and the first image are combined.

2. The projection device of claim 1, wherein the one or more instructions, when executed by the at least one processor, further cause the projection device to perform the image processing by differently applying the vignetting ratio according to locations of the edge region of the blur image.

3. The projection device of claim 1, wherein the one or more instructions, when executed by the at least one processor, further cause the projection device to generate the blur image by performing blur processing on the first image.

4. The projection device of claim 3, wherein the one or more instructions, when executed by the at least one processor, further cause the projection device to:

perform masking processing on a center region of the first image; and generate the blur image by performing the blur processing on the first image on which the masking processing has been performed.

5. The projection device of claim 3, wherein the one or more instructions, when executed by the at least one processor, further cause the projection device to:

add black padding to an edge of the first image; and generate the blur image by performing the blur processing on the first image to which the black padding has been added.

6. The projection device of claim 1, wherein the one or more instructions, when executed by the at least one processor, further cause the projection device to:

based on the first image including a letter box, remove the letter box from the first image; and generate the blur image by performing blur processing on the first image from which the letter box has been removed.

7. The projection device of claim 1, wherein the one or more instructions, when executed by the at least one processor, further cause the projection device to:

obtain a third image, based on the first image; and generate the blur image by performing blur processing on the third image.

8. The projection device of claim 7, wherein the one or more instructions, when executed by the at least one processor, further cause the projection device to:

obtain at least one of an atmosphere of the first image or a theme of the first image by analyzing the first image; and obtain the third image, based on at least one of the atmosphere of the first image or the theme of the first image.

9. An operating method of a projection device, the operating method comprising:

obtaining a first image;

generating a blur image, based on the first image;

obtaining a background image by performing image processing on an edge region of the blur image to exhibit a vignetting effect on the edge region such that a vignetting ratio, which is a ratio of a dark region, varies over time; and projecting a second image in which the background image and the first image are combined.

10. The operating method of claim 9, wherein the obtaining the background image comprises performing the image processing by differently applying the vignetting ratio according to locations of the edge region of the blur image.

11. The operating method of claim 9, wherein the generating the blur image comprises generating the blur image by performing blur processing on the first image.

12. The operating method of claim 11, wherein the generating the blur image comprises:

performing masking processing on a center region of the first image; and generating the blur image by performing the blur processing on the first image on which the masking processing has been performed.

13. The operating method of claim 11, wherein the generating the blur image comprises:

adding black padding to an edge of the first image; and generating the blur image by performing the blur processing on the first image to which the black padding has been added.

14. The operating method of claim 9, further comprising, based on the first image including a letter box, removing the letter box from the first image, wherein the generating the blur image comprises generating the blur image by performing blur processing on the first image from which the letter box has been removed.

15. The operating method of claim 9, wherein the generating the blur image comprises:

obtaining a third image, based on the first image; and generating the blur image by performing blur processing on the third image.

16. The operating method of claim 15, wherein the obtaining the third image, based on the first image, comprises:

obtaining at least one of an atmosphere of the first image or a theme of the first image by analyzing the first image; and obtaining the third image, based on at least one of the atmosphere of the first image or the theme of the first image.

17. A non-transitory computer-readable recording medium having stored thereon a program for performing an operating method of a projection device, the operating method comprising:

obtaining a first image;

generating a blur image, based on the first image;

obtaining a background image by performing image processing on an edge region of the blur image to exhibit a vignetting effect on the edge region such that a vignetting ratio, which is a ratio of dark region, varies over time; and projecting a second image in which the background image and the first image are combined.

18. The non-transitory computer-readable recording medium of claim 17, wherein the obtaining the background image comprises performing the image processing by differently applying the vignetting ratio according to locations of the edge region of the blur image.

* * * * *